E. Horton,
Harpoon,
N° 16,014. Patented Nov. 4, 1856.
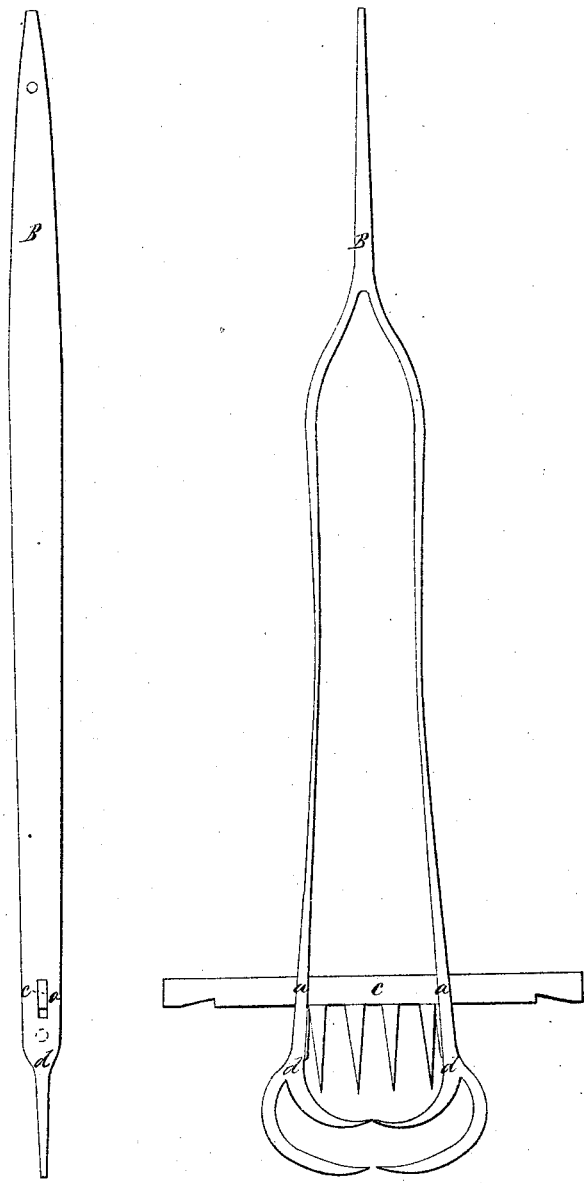

UNITED STATES PATENT OFFICE.

ELMORE HORTON, OF BRISTOL, CONNECTICUT.

FISHING IMPLEMENT.

Specification forming part of Letters Patent No. 16,014, dated November 4, 1856.

*To all whom it may concern:*

Be it known that I, ELMORE HORTON, of Bristol, county of Hartford, and State of Connecticut, have invented a new and useful Improvement in Fishing Implements; and I do hereby declare that the same is described and represented in the following specification and drawings.

To enable others skilled in the art to make and use the same, I will proceed to describe the construction and operation, referring to the drawings, in which the same letters indicate like parts in each of the figures.

The nature of my improvement in fishing implements consists in making spring-jaws which are set by means of a cross-bar provided with notches, or, what is equivalent, to hold the jaws open in readiness for operation.

In the drawings, $a\ a$ are spring-bars; $d$, the jaws; $b$, the shank, which enters and is made fast to the stale by which it is used or operated.

$c$ is the cross-bar, by which the instrument is held open by its notches $e\ e$ ready for operation, and made so as to slide in the apertures at $a\ a$.

In making these implements I forge the parts into shape and weld the two jaws or spring-bars together at the shank $b$. I also make apertures in or through the spring-bars, just above the hook or grab points at $a\ a$, so as to admit the ends of the cross-bar $c$ and allow it to work freely therein.

The cross-bar $c$ is provided with prong-points, but it is not considered essential always to use them in order to secure the effectual operation of the instrument, and being provided also with notches $e\ e$, which serve to hold the jaws apart in readiness for operation.

In manufacturing my improved fishing implements I do not confine myself to the precise manner in which it is described and represented in the accompanying drawings of putting them together, the shape, or the manner of securing the parts, whether they be welded together or riveted together, or to the particular kind of metals used in manufacturing them. It is designed sometimes to make them of cast or malleable iron and of several parts, and secure them together with rivets, so that it shall operate substantially in the same manner when finished.

I am aware that spring grab-hooks with notched cross-bar have been used; but

What I claim as my invention, and desire to secure by Letters Patent, is—

The spear cross-bar $c$, notched at each end $e\ e$, in combination with the spring-jaws $a\ a$, as herein set forth and described.

ELMORE HORTON. [L. S.]

In presence of—
   HENRY PERKINS,
   JEREMY W. BLISS.